United States Patent [19]

Carlson

[11] 4,006,114
[45] Feb. 1, 1977

[54] FLAME RETARDANT POLYPROPYLENE COMPOSITIONS

[75] Inventor: Allen William Carlson, Wayne, N.J.

[73] Assignee: Dart Industries Inc., Los Angeles, Calif.

[22] Filed: Nov. 26, 1975

[21] Appl. No.: 635,505

[52] U.S. Cl. .................. 260/28.5 D; 260/28.5 A; 260/42.17; 260/42.46; 260/45.7 R; 260/45.7 RT
[51] Int. Cl.$^2$ .......................................... C08L 91/00
[58] Field of Search ............. 260/28.5 A, 45.75 B, 260/28.5 D, 42.46, 45.7 RT, 45.7 R, 42.17

[56] References Cited
UNITED STATES PATENTS

| | | | |
|---|---|---|---|
| 3,803,067 | 4/1974 | Kehr et al. | 260/28.5 A |
| 3,936,403 | 2/1976 | Sakaguchi et al. | 260/28.5 A |

*Primary Examiner*—Melvyn I. Marquis
*Attorney, Agent, or Firm*—Margareta LaMaire; Bryant W. Brennan; Fred S. Valles

[57] ABSTRACT

A filled polypropylene composition having excellent flame retardance is prepared by blending polypropylene resin with chlorinated paraffin hydrocarbon, chlorinated polyethylene, antimony oxide and alumina trihydrate.

9 Claims, No Drawings

FLAME RETARDANT POLYPROPYLENE COMPOSITIONS

BACKGROUND OF THE INVENTION

The present invention relates to novel filled polypropylene compositions which are able to pass a more stringent flame retardance test than ASTM D-635.

In the past "flame retardant" polypropylene compositions, i.e. those passing ASTM test D-635 have been prepared by incorporation of chlorinated compounds into polypropylene resins. Additional flame retardants such as antimony oxide are often present in these compositions for the purpose of further enhancing flame retardancy.

One group of chlorinated compounds that have been suggested for such use, are the chlorinated paraffin hydrocarbons containing between about 40 to 80% chlorine and averaging 18 to 36 carbon atoms. Although the chlorinated paraffin hydrocarbons can be added in small amounts to polypropylene without any particular operating problems, it has been found that when added in quantities that should be sufficient for imparting acceptable flame retardance according to present standards the chlorinated hydrocarbons are incompatible with the polypropylene and will leach out during processing. The resultant tacky product will not pass a flame retardance test such as UL 94(1/16) with V-1 rating and will drip.

Another group of chlorinated compounds that is used as flame retardants in polypropylene compositions are the chlorinated polyethylenes containing between about 20 to 55 percent bound chlorine. However, even when added to polypropylene in a 50:50 weight ratio together with antimony oxide it was found that the composition will not pass the aforementioned UL 94 test and will burn.

In adding various inorganic filler such as glass, asbestos etc. to polypropylene containing any one of the aforementioned chlorinated compounds, flame retardance is somewhat improved due to the dilution effect, however not to an acceptable level.

Recently, compounds have been developed that act as combined fillers and flame retardants for various resins. A characteristic common to these compounds is that they contain bound moisture, which upon exposure of the filled resin to flame is released as water vapor. Thus, these fillers act as a flame-inhibiting heat sink. One such filler-flame retardant of particular interest is alumina trihydrate, which is effective in various thermoset resins, e.g. polyester, epoxies, phenolics and the like. However, due to the relatively low temperature at which water is liberated (230° C), the use of alumina trihydrate is limited to resins which can be processed, i.e. molded or cast, at temperatures well below the decomposition temperature of the alumina trihydrate. This limitation has precluded the use of alumina trihydrate in polypropylene compositions, which are usually processed at higher temperatures.

It is therefore an object of this invention to provide a filled polypropylene composition having improved flame retardance properties and which can be processed without decomposition of the filler.

THE INVENTION

In accordance with the present invention there is provided a composition which comprises polypropylene resin, chlorinated polyethylene, chlorinated paraffin hydrocarbon, antimony oxide and alumina trihydrate.

For purposes of this invention, polypropylene resin is intended to cover homopolymer of propylene as well as various copolymers of propylene and another α-olefin such as ethylene, butylene and the like or mixtures of homopolymer and copolymer. The copolymers can be random copolymers or block copolymers wherein the blocks themselves may be either homopolymers or random copolymers. Also, included in the definition of polypropylene resin are various mixtures of propylene homopolymer or copolymer with a polymer of at least one other α-olefin such as ethylene. In general the polymerized propylene content of these polypropylene resins should be at least 75 percent by weight.

The chlorinated polyethylene is one containing bound chlorine in a range from about 20 to about 55 percent by weight and can be derived from a polyethylene of any density. Chlorinated polyethylenes are well known compounds, which are commercially available in a wide range of chlorine concentrations. Sufficient chlorinated polyethylene should be added to provide a weight ratio thereof to polypropylene resin in the range of about 20:80 to 50:50.

The chlorinated paraffin hydrocarbon should be one that contains on the average from about 18 to about 36 carbon atoms and between about 40 to about 80 percent by weight of bound chlorine. These compounds are commonly derived by chlorination of soft or slack waxes and are commercially available materials. The concentration of chlorinated paraffin should be at least 15 parts, and preferably at least 20 parts per 100 parts of combined polypropylene resin and chlorinated polyethylene.

Preferably, chlorinated polyethylene and chlorinated paraffin hydrocarbon should be added in sufficient quantities to provide a chlorine concentration of at least 25 percent based on the total weight of polypropylene resin, chlorinated polyethylene and chlorinated paraffinic hydrocarbon.

Antimony oxide is added for its known function in quantities of at least 5 parts per 100 parts of the combined weights of polypropylene resin and chlorinated polyethylene.

The alumina trihydrate component is used in the composition of this invention in amounts of at least 20 parts by weight per 100 parts of the combined weights of polypropylene resin and chlorinated polyethylene resin. The preferred range is between about 35 and about 100 parts of the aforementioned resins.

The alumina trihydrate is a readily available material in that it is an intermediate product in the production of aluminum metal. The average particle size of the trihydrate typically ranges from about 0.5 to about 25 microns. As a component of the composition of this invention it is preferred to use one having a relatively small average particle size e.g. from about 0.5 to about 5.

Other ingredients may also be added for purposes well known in the art. Such ingredients include plasticizers, dyes, pigments, lubricants, heat and light stabilizers, antioxidants, antistatic agent, synthetic or natural reinforcing fiber or fillers and the like.

The components of the composition may be blended using any of the well known techniques, e.g. by milling on a two-roll mill, by mixing in a Banbury mixer, by extrusion of dry blended components or any other technique employing temperatures below the decomposition temperature of alumina trihydrate.

It was unexpectedly found that in addition to being low smoke generating and able to meet the the stringent UL 94 test (one-sixteenth inch) with at least a V-1 rating, the composition in accordance with the present invention is readily processed at temperatures well below the decomposition temperature of alumina trihydrate, i.e. temperatures e.g. in the range of 35° to 400° F. can be employed in shaping various articles from the composition. Also, it was discovered that in this system the chlorinated paraffin hydrocarbon component was completely compatible upon molding, resulting in shaped articles of excellent quality and appearance.

The composition can be employed in a variety of applications where flame retardance is a quality of particular importance. Examples of such applications include the use as structural components in television sets, radios and various home appliances. In order to provide a better understanding of the invention, reference is had to the following examples. Unless otherwise noted, all parts, proportions and percentages are expressed in terms of weight.

EXAMPLE 1

A mixture of 60 parts polypropylene homopolymer, 40 parts chlorinated polyethylene (containing 42% bound chlorine and available under the tradename DOW 4213), 20 parts chlorinated paraffin hydrocarbon (containing 70% bound chlorine and available under the tradename CHLOREZ 70 HMP from Dover Chemical Corporation), 10 parts antimony oxide, 40 parts alumina trihydrate having an average particle size of less than 1 micron (available under the tradename HYDRAL 710 from Alcoa) and 5 parts stabilizers and lubricants was compounded in a Banbury mixer at about 350° F. The resulting composition passed the UL 94 one-sixteenth inch flammability test with a V-0 rating and could easily be processed in subsequent molding operations without either decomposition of the alumina trihydrate or release of chlorinated paraffin hydrocarbon.

EXAMPLE 2

Another composition was prepared similarly except that the polypropylene resin was a copolymer of ethylene and propylene having an ethylene content of about 3%, and 60 parts of the alumina trihydrate was used. The composition had a flammability rating of C-1 (UL 94 one-sixteenth inch) and excellent other physical properties: melt flow (2.16 kg at 190° C) of 1.8 grams/10 min., notched Izod impact of 8.5 ft.lbs./in., flexural strength of 2800 psi, flexural modulus of 122,000 psi, tensile strength at yield of 2500 psi, tensile strength at break of 1900 psi and elongation of 117%.

In contrast, experiments with compositions containing polypropylene (homopolymer) and chlorinated polyethylene (tradename DOW 2243.15, 48% bound chlorine) in a 50:50 weight ratio and containing 5–10 parts antimony oxide per 100 parts of the combined weight of polypropylene and chlorinated polyethylene, resulted in failure of the UL 94 one-sixteenth inch flammability test and similar compositions also containing 25–40% glass fibers did not pass the aforementioned test.

Other experiments employing 60 parts of the polypropylene resin of Example 2 compounded with 40 parts alumina trihydrate resulted in compositions failing the flammability test. In addition, the polypropylene/alumina trihydrate compositions could not be processed, i.e. molded, at conventional processing temperatures without decomposition of the alumina trihydrate. Other experiments with compositions containing 60 parts polypropylene, 40 parts chlorinated polyethylene, (42% bound chlorine), 20 parts chlorinated paraffin (70% bound chlorine) and 10 parts antimony oxide also resulted in inferior flammability ratings. When 30 parts glass fibers were also included in the latter compositions some improvement was noted, however, 40% of the tests still failed the flammability test.

While this invention has been described in detail for the purpose of illustration, it is not to be construed as limited thereby but is intended to cover all changes and modifications within the spirit and scope thereof.

What is claimed is:

1. A flame retardant polypropylene composition which comprises:
   a. polypropylene resin
   b. sufficient chlorinated polyethylene to provide a weight ratio of chlorinated polyethylene to polypropylene in the range from about 20:80 to about 50:50, said chlorinated polyethylene containing from about 20 to about 55 percent by weight bound chlorine;
   c. at least 5 parts by weight of antimony oxide per 100 parts of the combined weights of polypropylene and chlorinated polyethylene;
   d. at least 15 parts by weight of chlorinated paraffin hydrocarbon per 100 parts of the combined weights of polypropylene and chlorinated polyethylene, said chlorinated paraffin hydrocarbon containing on the average from about 18 to 36 carbon atoms per molecule and between about 40 to about 80 percent by weight bound chlorine.
   e. at least 20 parts by weight of alumina trihydrate per 100 parts of the combined weights of polypropylene and chlorinated polyethylene.

2. The composition of claim 1 wherein the chlorine concentration based on the total weight of polypropylene resin, chlorinated polyethylene and chlorinated paraffin hydrocarbon is at least 25 percent by weight.

3. A composition according to claim 1 wherein at least a portion of the polypropylene resin is a propylene homopolymer.

4. A composition according to claim 1 wherein at least a portion of the polypropylene is a copolymer of propylene and another α-olefin.

5. A composition according to claim 1 wherein the concentration of chlorinated paraffin hydrocarbon is at least 20 parts per 100 parts of the combined weights of polypropylene resin and chlorinated polyethylene.

6. A composition according to claim 1 wherein the alumina trihydrate is present in concentrations ranging between about 35 and about 100 parts per 100 parts of the combined weights of polypropylene resin and chlorinated polyethylene resin.

7. A composition according to claim 1 also containing reinforcing fibers.

8. A composition according to claim 4 wherein the other α-olefin is ethylene.

9. A composition according to claim 1 wherein the average particle size of the alumina trihydrate is between about 0.5 and about 5 microns.

* * * * *

UNITED STATES PATENT AND TRADEMARK OFFICE
CERTIFICATE OF CORRECTION

PATENT NO. : 4,006,114
DATED : February 1, 1977
INVENTOR(S) : Allen William Carlson It is certified that error appears in the above-identified patent and that said Letters Patent are hereby corrected as shown below:

In column 3, line 50 "C-1" should be "V-1"

Signed and Sealed this

Nineteenth Day of April 1977

[SEAL]

Attest:

RUTH C. MASON
*Attesting Officer*

C. MARSHALL DANN
*Commissioner of Patents and Trademarks*